United States Patent [19]

Gore

[11] Patent Number: 4,753,628

[45] Date of Patent: Jun. 28, 1988

[54] PULLEY AND SHAFT COUPLING SYSTEM

[76] Inventor: Gregory J. Gore, 210 Hastings Ct., Doylestown, Pa. 18901

[21] Appl. No.: 947,032

[22] Filed: Dec. 29, 1986

[51] Int. Cl.⁴ .............................................. F16H 7/10
[52] U.S. Cl. .................................... 474/112; 474/141; 474/152
[58] Field of Search ..................... 474/112, 152, 84–89, 474/179, 141

[56] References Cited

U.S. PATENT DOCUMENTS

| 817,604 | 4/1906 | Williams | 474/141 |
| 3,060,760 | 10/1962 | Minnis | 474/112 X |
| 3,064,487 | 11/1962 | Warrick et al. | 474/112 |
| 3,131,529 | 5/1964 | Keyser | 474/86 X |
| 3,396,988 | 12/1966 | Kroening | 280/96 |

Primary Examiner—Stephen J. Novosad
Assistant Examiner—Thuy M. Bui

[57] ABSTRACT

A power transmission system utilizes a pair of pulleys in spaced parallel relation interconnected by a plurality of endless drive belts. Each pulley contains a plurality of eccentric drive lobes. The drive lobes have no teeth or means for increasing sliding friction between the lobes and each drive belt. Drive belts contain no apertures or joints and may be constructed of multiple wraps of any fiber or filament. A plurality of drive lobes spaced equally, about a 360-degree arc, link both shafts fully providing a smooth and even delivery of continuous turning force in either direction of rotation.

26 Claims, 4 Drawing Sheets

PULLEY AND SHAFT COUPLING SYSTEM

FIELD OF INVENTION

This invention relates to the field of power transmission between rotating parallel shafts and, specifically, to systems using pulleys and belting.

BACKGROUND OF THE INVENTION

Shaft coupling between parallel shafts is usually achieved through the use of chain and sprockets or V-belt and pulleys. These systems rely on frictional circumferential drive forces where an interconnecting element such as a belt or chain, under tension, frictionally engages the circumference of a sprocket or pulley mounted on each shaft. The interconnecting belts and chains circulate around each sprocket or pulley and run between the shafts.

Relative to the present invention, however, these methods of shaft coupling are expensive, inefficient and sensitive to environmental conditions, including the need for lubrication or, conversely, a sensitivity to lubricants which may cause slippage in a system such as the commonly used V-belt and pulley. In addition, the problems with V-belt drive systems operating in corrosive atmospheres are well-known.

DESCRIPTION OF THE PRIOR ART

The closest prior art of which the applicant is aware is U.S. Pat. No. 3,396,988 in which eccentrically mounted sprockets transmit power between parallel shafts through interconnecting chains. It is also known in the art to use individual single run cables terminated at journaled multiple throw crankshafts as described in U.S. Pat. No. 2,398,568. However, it is not previously known in the art to use endless belts riding directly upon eccentric elements without any links or journals and with both the belts and eccentrics designed to minimize the friction between them. With this new method, force is transmitted through the belts by the displacement of the eccentrics and not by traction with the surface of the eccentric. This unique combination as disclosed in more detail further herein allows a wide selection of construction material and displays many unique and unexpected properties, including superior performance in many applications.

SUMMARY OF THE INVENTION

The present invention includes a novel pulley, one embodiment of which may be formed by locating eccentric radial drive lobes, axially spaced and affixed to a common core sleeve. The core sleeve contains a central open bore so that it may be fitted at any point along a drive shaft.

The drive lobes are a unique three-sided polygonal design which has been discovered to be the theoretical optimum when used with belting having ideal characteristics. This wedge-shaped lobe as described further herein subtends an arc of approximately 90 degrees measured at the axis of rotation. This shape is not merely a design choice, but the optimum structure which results from the mechanical interrelationship of the belting and lobes. This three-sided, wedge-shaped drive lobe permits a direct drive even though it is toothless and cooperates with drive belts which have no teeth, links, or apertures for receiving teeth.

A power transmission system may be created by using a pair of these pulleys in spaced parallel relation interconnected by a plurality of endless drive belts which are fitted around the outer circumferences of a pair of opposing eccentric drive lobes. Each drive belt may contact only a portion of the circumference of each lobe and is active only when its respective eccentric lobe on the driving shaft is moving away from the driven shaft. However, a plurality of these belt and lobe combinations equally spaced about a 360-degree arc links both shafts fully, providing a smooth and even delivery of continuous turning force in either direction of rotation. In this system, tension in each belt is intermittent while the rotary motion is continuous. The importance of this feature is described hereinafter.

Each drive belt runs directly on the surface of two opposing lobes. This eliminates the need for lubrication and contributes to the simplicity of the design. It will be appreciated from those of skill in the art that the present invention transmits power through rolling friction only and not sliding friction as is required by other circumferential power transmission systems. If a particular application so requires, a friction-reducing coating may be applied to the drive lobes. Conversely, pulley coatings added to prevent corrosion or to increase durability may be used with little concern for their effect on pulley friction. Because there is little friction, there is no heating of the pulleys during the operation and, hence, no need for cooling.

Circular spacer plates may be included between adjacent lobes to limit lateral movement of the drive belts. The drive lobes and spacer plates may be assembled on the common core sleeve or molded as a unit for convenient and inexpensive manufacturing.

The drive belts can be made from any strand, wire, belt, or filament which is strong and light. Because the power transmission of the present invention does not rely upon sliding friction, but only upon rolling friction, there is no requirement that the belting have a minimum coefficient of friction or be any one shape in cross-section. Ideally, the contact area between belt and drive lobe should be minimized. Because the system generates very little heat, belt life of the present invention is vastly extended over the prior art coupling systems thereby reducing maintenance and replacement costs.

The present invention displays many unique operational features. For instance, the drive system may be clutched into and out of engagement without losing the relative timing between the driving and driven shafts. The clutching may be achieved by simply changing the distances between the driving and driven shafts.

Because the drive belts can be made from extremely light weight yet strong synthetic fibers, the present invention can efficiently transmit power over greater distance than previously known. Also, there is very little lost motion caused by slack in the belting due to the force of gravity. Accordingly, only a very small amount of preloaded tension is required to take up the belt sag so that the belts are always straight and taut between the pulleys. This yields a very responsive and accurate system of rotary motion control.

Through prudent selection of materials, the present invention may work well in most any environment. As an extreme example, the present invention may operate quite satisfactorily when completely submerged in a liquid, such as oil or water. In an alternate embodiment, the use of resilient belting provides a power transmission system with the ability to accommodate changes in the distance between the shafts during operation and also to absorb shock without wear or damage to the belting.

In yet another embodiment of the present invention, a supplementary belt is laid over opposing pulleys. This additional belt has a width equal to the entire width of each pulley. This extra belt is of the normal friction drive type is is particularly useful in a clutching arrangement to help contain the inner belting and also to bring the pulleys up to speed upon initial engagement.

It is therefore an object of the present invention to create a positive drive, continuous rotary power transmission system which requires no lubrication, yet is very efficient.

It is another object of the present invention to provide a power transmission system which functions well in extreme environments, such as corrosive atmospheres, dust, humidity, heat, or cold.

It is another object of the present invention to create an accurate and responsive drive system which unites rotary shafts.

It is a further object of the instant invention to create a high r.p.m. mechanical coupling system between parallel shafts which is highly efficient and which operates only by rolling friction.

It is another object of the present invention to create a mechanical power transmission system between parallel shafts which is not sensitive to changes in the distance between the shafts during operation.

It is a further object of the present invention to create a mechanical coupling system for parallel shafts which maintains the timing between the shafts yet may be clutched and re-engaged without altering the timing between shafts.

Further advantages and objects of the present invention will be readily apparent from the following description and drawings.

DESCRIPTION OF THE PREFERRED EMBODIMENT

Figure 1:
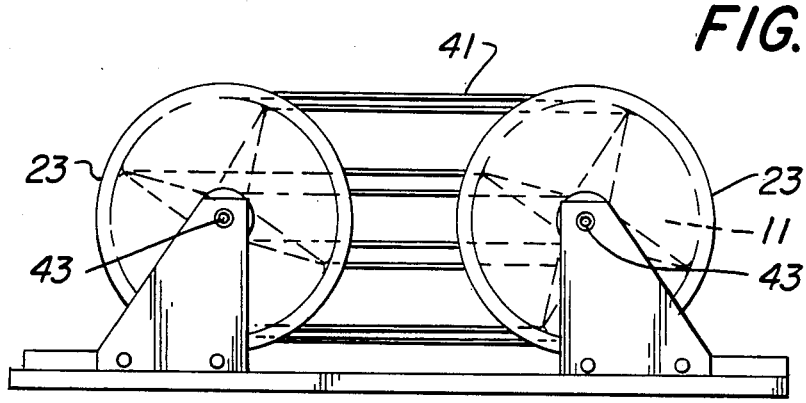
FIG. 1 shows the side view of two pulleys with interconnecting belting.
Figure 3:
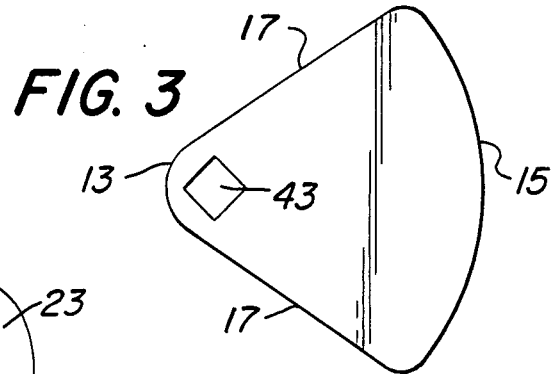
FIG. 3 is a side view of a wedge-shaped drive lobe.
Figure 2:
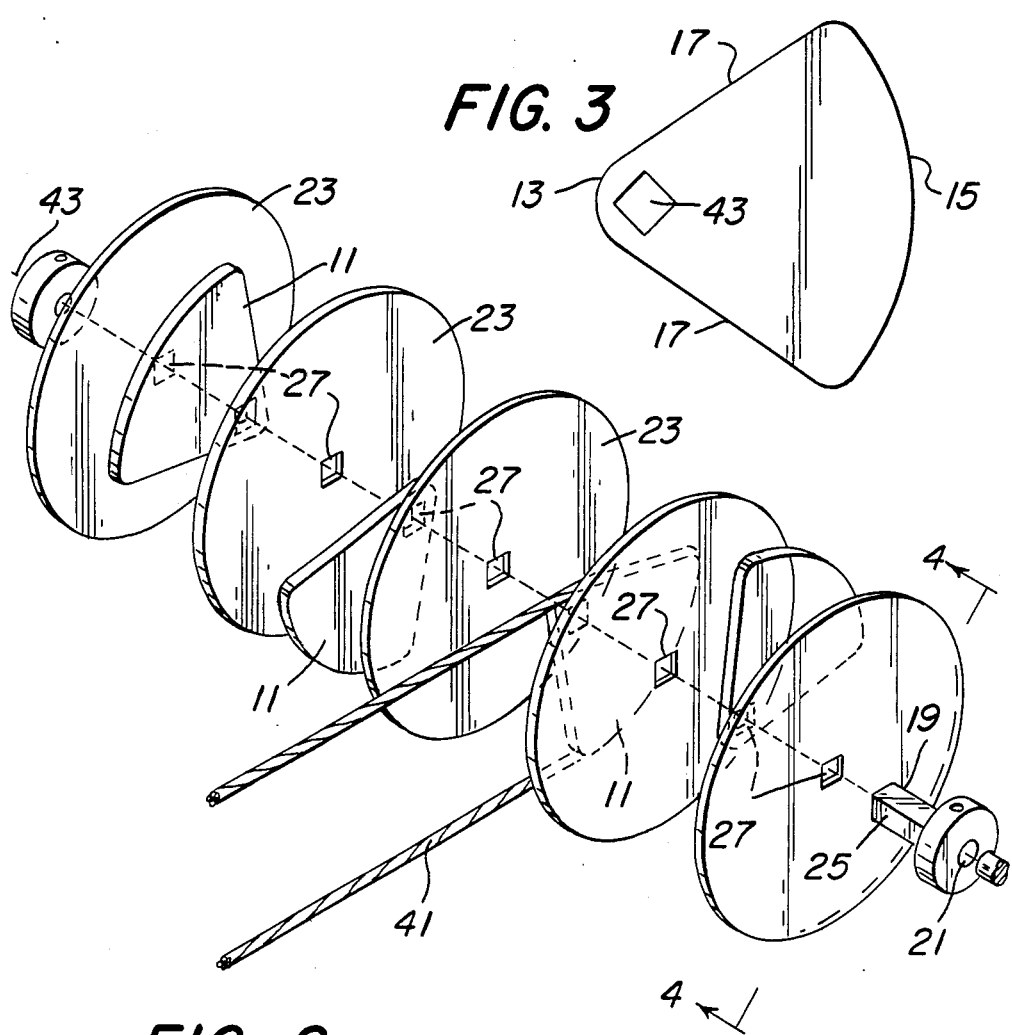
FIG. 2 is an exploded view of one pulley shown in FIG. 1.
Figure 5:
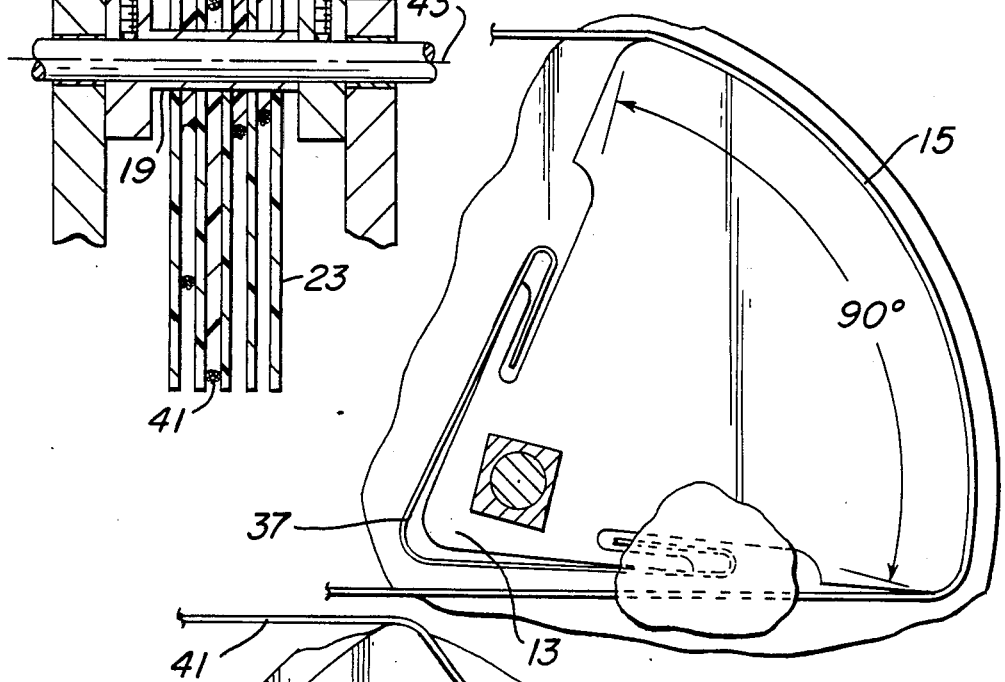
FIG. 5 is a side view of an alternate embodiment wherein a spring clip has been added to each drive lobe to increase belt tension.

Referring to FIG. 2, a pulley is shown using polygonal, wedge-shaped lobes 11 equally spaced radially 90 degrees apart in a four-lobe format. Referring now to FIG. 3, each lobe contains an apex 13 and three sides, including a curved circumferential face 15 portion, and two flat radial side portions 17. The three corners of each lobe are radiased to minimize the radius of wrap required by the drive belts. The circumferential face 15 of each lobe subtends an arc of approximately 90 degrees measured at the axis of rotation as indicated in FIG. 5.

Figure 7:
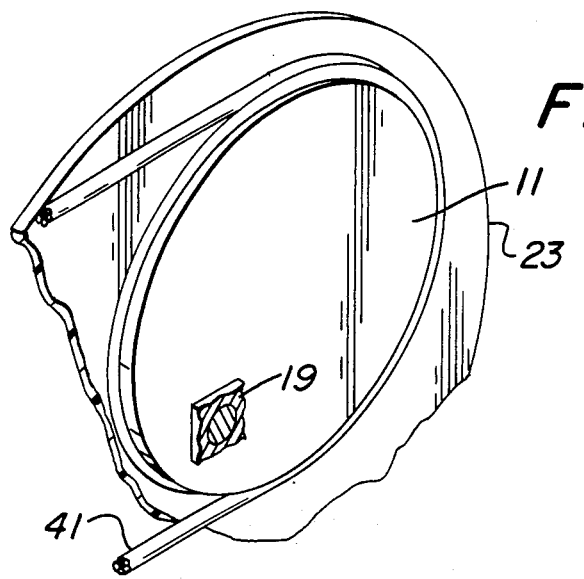
FIG. 7 shows an alternate embodiment wherein the belting is wound a plurality of turns around a circular drive lobe.
Figure 9:
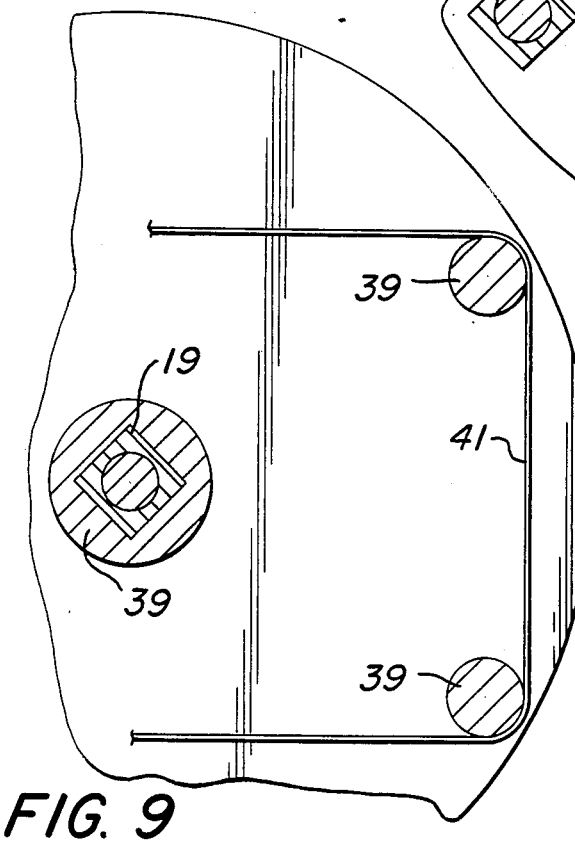
FIG. 9 is an alternate embodiment wherein the drive lobes are replaced by pins secured between adjacent spacer plates.

The 90 degree lobe shape is theoretically optimal regardless of the number of lobes employed per pulley. Using this shape, mechanical leverage of the pulleys is maximized over the greatest extent of rotation. Other shapes may be used depending upon the requirements of the system and a solid lobe may be replaced by separate pins 39 at the three corners as shown in FIG. 9. However, the solid lobe design is structurally stronger. If a belting material 41 is used which is sensitive to angle of wrap, a lobe having greater radius corners or even a circular cross-section as shown in FIG. 7 may be used with some sacrifice of torque transmission capability.

Referring again to FIG. 2, four drive lobes 11 are mounted on a common core sleeve 19 which has an open bore 21 for routine shaft mounting. Spacer plates 23 are located between adjacent drive lobes to limit the axial movement of the drive belting 41. The core sleeve 19 circumference contains a square cross-section portion 25 for engaging like apertures 27 in both the spacer plates and lobes. The lobes are located with the apex of each lobe as close to the axis of rotation 43 as possible. This maximizes the mechanical advantage between the pulleys and belts.

Figure 4:
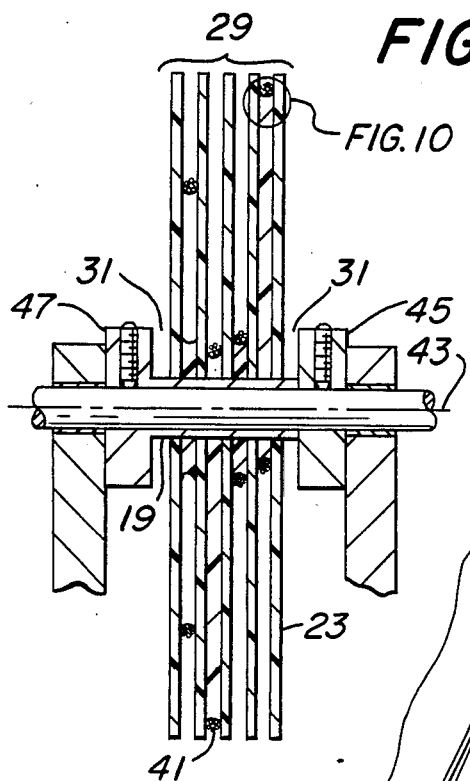
FIG. 4 is a sectional view of FIG. 2.

Referring to FIG. 4, the lobes and spacer plates may either be force fit on the core sleeve or axially secured between collar means 47 on one end and a second collar 45 on the opposite end. In FIG. 4, the spacer plates and drive lobes are affixed together, and this subassembly as a unit 29 is permitted to move axially along core sleeve 19 because of lateral spaces 31 which allow the operational elements of the pulley to be self-centering.

Figure 10:
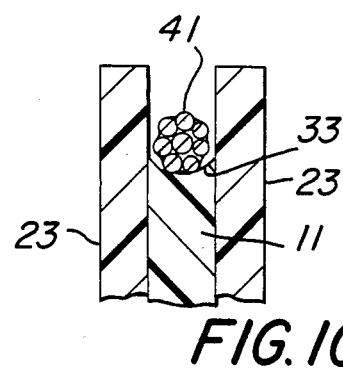
FIG. 10 is a front view showing relationship between the drive lobe groove and drive belt.

Referring to FIG. 10, the drive lobes 11 may contain an endless groove 33 around their lateral periphery to ensure the centering of the drive belts 41. The groove 33 is for alignment purposes only and therefore should be substantially greater in width than the width of the drive belt 41 to minimize contact area.

The drive belts 41 are preferably made of synthetic-type materials, such as glass, Kevlar(R), Spectra(R), or a graphite fiber. The main requirement of the drive belting of this invention is that the material be extremely strong and light, yet flexible. This permits the pulleys to be spaced a great distance apart without creating excessive slack in the drive belting. Also, the belts require only a small amount of preloaded tension and may operate at very high r.p.m.

In an alternate embodiment of the present invention, elastic or highly resilient drive belts are used to create a power transmission system which can absorb shock and vibration yet transmit a surprising amount of power without slippage. Also, this system can adjust to extreme changes in the distance between coupled pulleys during operation without slippage or interruption and without excessive wear or damage to the drive belts.

Figure 8:
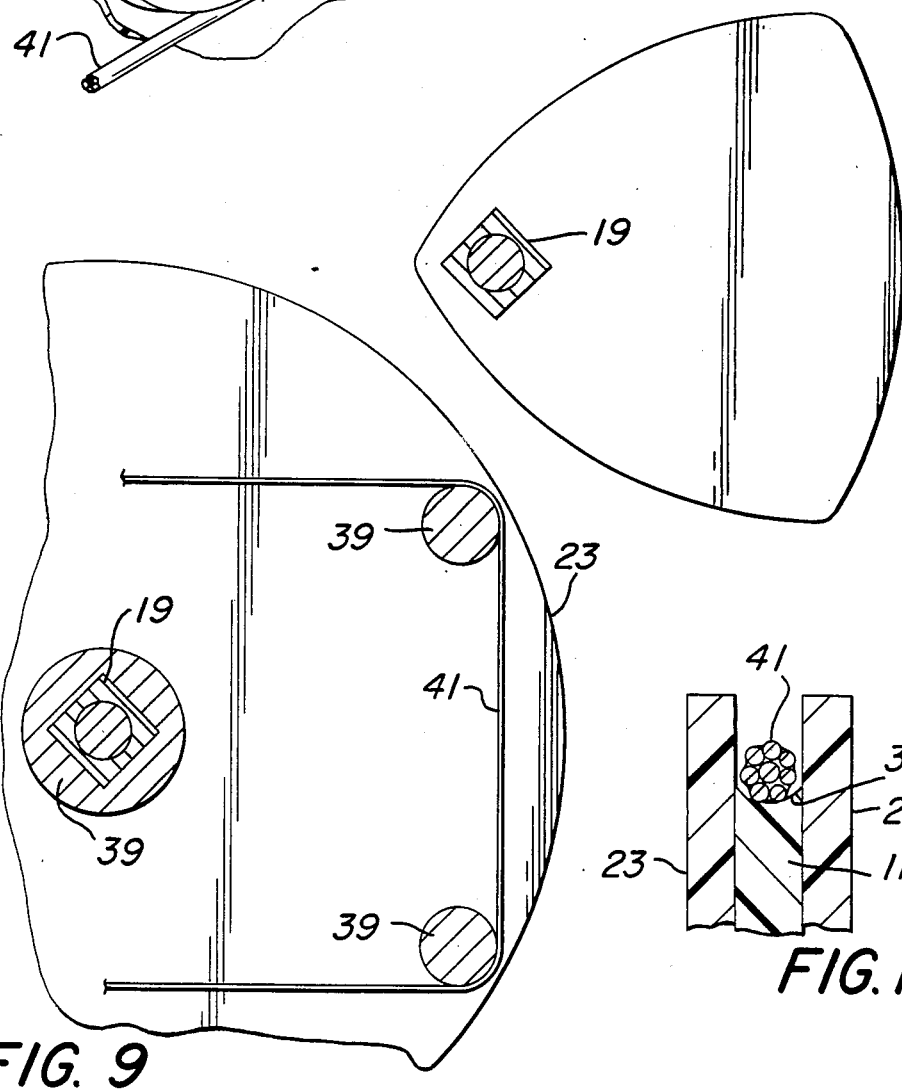
FIG. 8 is an alternate drive lobe design.

FIG. 8 shows a drive lobe having sides consisting of three equal arcs. This design combines a three-sided polygonal efficiency and maintains equal spacing between upper and lower runs of the belting during operation.

Figure 6:
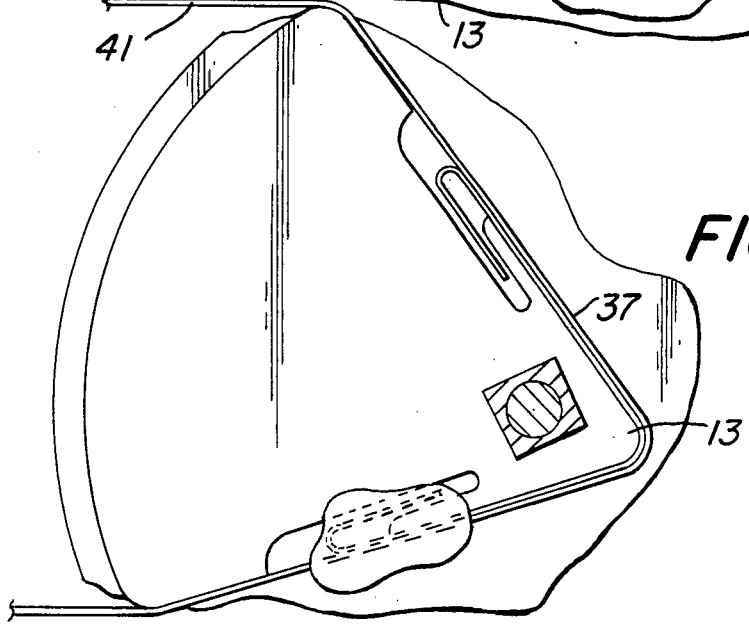
FIG. 6 shows the spring-clip tensioner under compression.

Referring now to FIGS. 5 and 6, in another alternate embodiment of the present invention, a belt-engaging spring clip 37 is added to the apex of each drive lobe to provide additional drive belt tension. These added structures may be useful to take up drive belt slack during periods of clutching. Furthermore, as shown in FIG. 7, the belt may make a plurality of turns about each lobe to also control belt movement during clutching with or without the addition of the spring clip structure.

In yet another alternate embodiment of the present invention, drive belts are constructed only from multiple wraps of a single strand or fiber bundle which are bonded together with a suitable agent or simply knot tied at loose ends. A drive belt of this type should have a generally circular cross-section to minimize lobe contact area as shown in FIG. 10.

Figure 11:
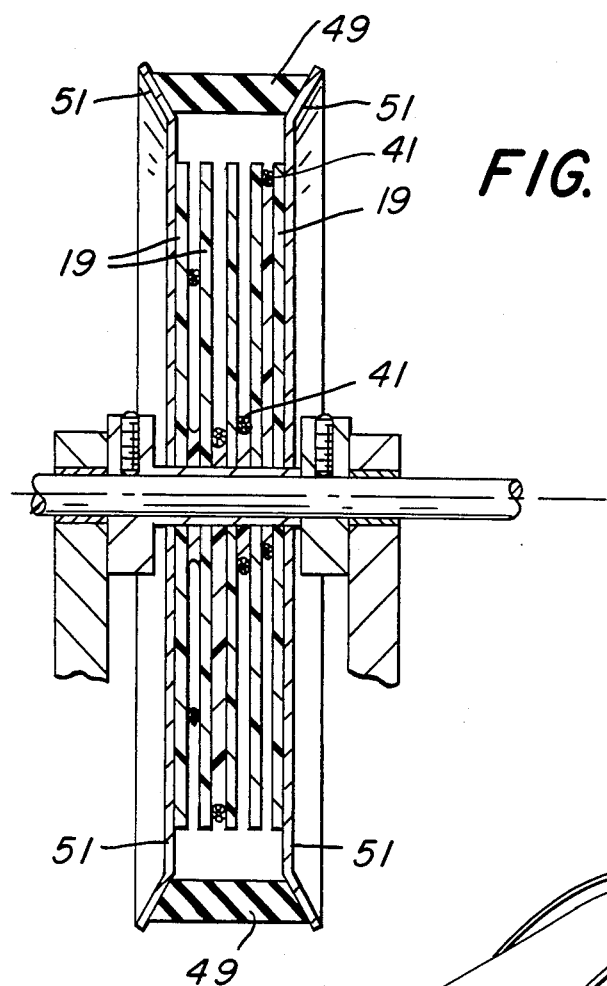
FIG. 11 is a sectional view of an alternate embodiment wherein an outer V-belt and V-pulley sheaves are added.
Figure 12:
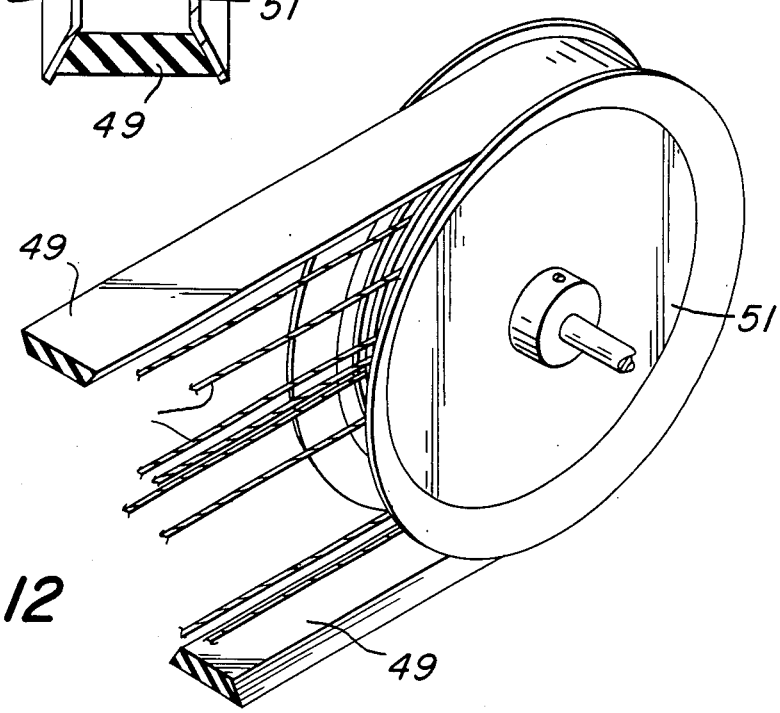
FIG. 12 is a perspective view of the embodiment depicted in FIG. 11.

FIGS. 11 and 12 show an embodiment wherein outer friction belt 49 is laid over the exterior of two opposing pulleys in a drive system. This additional friction belt is particularly useful in clutching systems in order to both contain the inner belting and also to bring the driven pulley up to speed upon initial engagement. Thereafter, the pulleys are synchronized and phase locked by the inner belting which operates on the eccentric elements. This added belt need not transmit any power after the pulleys are fully engaged and therefore it can be a very light weight and flexible material.

It should be understood that while the preferred embodiment disclosed shows an assembly of parts, the equivalent structure may be created from a molding process to create a pulley of unitary construction.

OPERATION

The present invention has many novel operating characteristics. As mentioned, power transmission between shafts is by way of rolling friction only. This yields the advantages of extremely high efficiency, high r.p.m., with a wide selection of materials. For instance, materials may be chosen to have corrosion resistance without having to meet the frictional requirements of a belt system or lubrication requirements of a chain system. Materials are selected only for their strength, light weight, and flexibility. Frictional coefficients and melt point are not necessarily concerns, except that in most embodiments friction is to be avoided as it can affect operating efficiency. To reduce friction, a coating may be added to the belt-engaging surfaces of the pulleys.

A surprising and unique aspect of the present invention is that each belt is only under tension for a portion of each 360-degree rotation of each pulley, namely for approximately 180 degrees. There is therefore a period of tension and a period of relaxation through all elements of each belt within each revolution even though rotary motion is continuous. This operating characteristic is particularly useful when the belting is wound a plurality of turns around each lobe for belt control as indicated in FIG. 7. In this configuration, a belt 41 with some stiffness, such as a light metal wire, should be used so there is a lateral coil pressure of the wire along the surface of the lobes. The lobes in this embodiment should have a circular cross-section. This lateral coil pressure separates the turns of wire on the lobe to prevent doubling over and binding. During the slack period of each rotation, there is no tension on the wire and the lateral coil pressure is sufficient to move the belting along the face of the lobe to prevent overlapping. This is a unique operating characteristic of the present invention which is possible only because individual belt tension is intermittent, even though the belts as a group provide a continuous and even delivery of turning force to the driven pulley.

Another novel operating characteristic of the present invention is that the pulleys may be clutched into and out of engagement without losing the relative timing between the driving and driven shafts. Clutching may be achieved by simply changing the distance between the shafts.

In a power transmission system which is designed for clutching, the additional outer belt and sheaves as shown in FIG. 11 may be added in order to help bring the driven pulley up to speed before the engagement point of the inner belting is reached. The additional belt, because it surrounds the outer circumference of both pulleys as a normal V-belt would, helps keep the inner belting from jumping off of their respective drive lobes.

The power transmission system disclosed herein may be particularly useful as a drive system used in corrosive atmospheres, including sea coast sites, marine applications, and chemical or industrial plants. Furthermore, it should be noted that for a given diameter of pulley, the instant invention transfers a much greater amount of turning force or torque than a standard V-belt and also the driving and driven shafts remain positively coupled without any slippage so long as the material strength of the system is not exceeded. The light belting accommodates a tight wrap angle and therefore small diameter pulleys can be used with great efficiency. Because each pulley is in perfect dynamic balance and the belting extremely light, the r.p.m. capability of this system far exceeds prior art power transmission systems.

One embodiment of the present invention as shown in FIGS. 5 and 6 employs the addition of belt-engaging springs 37 fitted over the apex of each drive lobe 13. This spring engages the drive belt and helps take up drive belt slack during periods of clutching. Even without the inclusion of these springs, however, the present invention tolerates a great deal of change in the distance between the drive shafts. Surprisingly, the oscillating motion of the belts by the drive lobes creates a whipping action at high r.p.m. and therefore the belts become self-tensing at speed.

Another major benefit of the present invention is its economy of manufacture. Because of the simplicity of each of the components, the strong structural design, and the limited requirements of each component, the system may be constructed from very inexpensive materials. For example, the pulleys may be molded of plastic and used in small diameters. In the prior art, plastic can only be used for larger diameter (i.e. slower belt speed, and greater wrap angle) applications because of heating due to slippage and the low melt point of the plastic. Also, as mentioned, the belting may be simply multiple-wrap loops of a single strand of fiber simply knot tied at loose ends. This permits replacing a broken drive belt by hand-making the item inexpensively and quickly onsite from raw materials. Commonly available nature fibers, such as cotton, may be used.

While the above description contains many specificities, they should not be considered as limitations upon the scope of the present invention but rather of examples of preferred embodiments thereof. Many other variations altering scale and geometry, among other factors, are possible. The present invention is to be defined only by the appended claims and their legal equivalents.

What is claimed is:

1. A drive pulley for transmitting power from belting to a drive shaft on which said pulley is mounted, comprising:
   a. a drive shaft having an axis of rotation,
   b. a plurality of toothless lobes for engaging said belting, said lobes being axially spaced and eccentrically located about said axis, and
   c. means for connecting said lobes to said shaft to prevent rotation therebetween.

2. The pulley of claim 1 further described in that said lobes are polygonal having sides approximately described by three equal arcs.

3. The pulley of claim 1 further including a plurality of axially spaced concentric circular plates affixed to said shaft separating adjacent lobes and extending radially beyond said lobes, said plates being concentric with said axis.

4. The pulley of claim 3 further including a belt-aligning groove located along the lateral periphery of each lobe.

5. The pulley of claim 4 further described in that each lobe has a polygonal shape.

6. The pulley of claim 5 further described in that said lobes are three-sided having an apex, two side portions, and an arcuate circumferential face, and located such that the rotational axis of said shaft passes through each lobe near the apex of said lobe.

7. The pulley of claim 6 further described in that the circumferential face of each of said three-sided lobes subtends approximately a 90 degree arc measured at the axis of rotation.

8. The pulley of claim 7 further including a belt engaging resilient member slideably affixed to each lobe.

9. The pulley of claims 3, 4, 5, 6, 7 or 8 wherein said plates and said lobes are affixed together to form a unitary subassembly and said subassembly being slideably affixed to said shaft such that said subassembly may move freely along said shaft axially.

10. A pulley as described in claim 1, 3, 4, 5, 6, or 7 further including:
   a. a second identical pulley in spaced parallel relation, and
   b. a plurality of endless drive belts, each belt engaging both pulleys and running directly on one lobe of each pulley making only one-half turn about each lobe.

11. The pulley of claim 7 further including:
   a. a second identical pulley having a rotational axis in spaced parallel relation, and
   b. a plurality of endless drive elements without teeth, apertures, or joints for engaging teeth, each element engaging a groove on one lobe of each pulley, making only one-half turn about each lobe and being substantially narrower than the width of said grooves.

12. The power transmission system of claim 11 wherein said drive elements are of substantially circular cross section and composed solely of a multiple wrap of a single strand or fiber bundle unified by a bonding agent.

13. The power transmission system of claim 11 wherein said drive elements are relatively elastic whereby the distances between said pulleys may change during operation without interrupting the transmission of power and without requiring any additional tension promoting mechanisms.

14. The power transmission system of claim 11 wherein said drive elements have a minimum coefficient of friction.

15. The power transmission system of claim 14 wherein said drive elements consist of only a multiple wrap of a single strand or bundle of synthetic fiber, including Spectra(A), Kevlar(R), glass, or graphite fiber plus a bonding agent.

16. The power transmission of claim 15 further including a friction-reducing coating on the belt-engaging surfaces of said pulleys.

17. The power transmission system of claim 11 further described in that said drive elements are wound about each of said lobes a plurality of turns.

18. A power transmission system of claim 11 wherein the plates and lobes of each pulley are affixed together as a unitary subassembly and said subassembly is slideably affixed to said shaft such that said subassembly may move freely along the shaft axially.

19. The pulley system of claim 11 further described in that said endless drive elements are substantially inelastic.

20. The pulley of claim 4, 5, 6, or 7 further including:
   a. a second identical pulley having a rotational axis in spaced parallel relation, and
   b. a plurality of endless drive belts each without teeth, apertures, or joints for engaging teeth, each belt engaging the grooves on the lobes of both pulleys, each belt running directly on one lobe of each pulley making only one-half turn about each lobe and being substantially narrower than the width of said grooves.

21. A pulley as described in claims 1, 3, 4, 5, 6, or 7, said pulley being the first of two drive pulleys in a continuous rotary power transmission system, further including:
   a. a second pulley identical to said first pulley in spaced parallel relation therewith,
   b. a plurality of endless drive belts engaging both pulleys, each belt running directly on only one lobe of each pulley, and
   c. a belt-engaging groove located on the periphery of each lobe, the width of said grooves on said lobes being substantially greater than the width of said drive belts to minimize the area of contact between said belts and said lobes.

22. The power transmission system of claim 21 further described in that said drive lobes have a circular cross-section.

23. The power transmission system of claim 21 further including a friction drive belt running around the circular concentric spacer plates and having a width which extends the full width of the two pulleys, said belt engaging circular sheaves concentric with said axes of rotation.

24. The pulley system of claim 23 wherein said friction drive belt is a V-belt.

25. The pulley of claim 1 further described in that said lobes are equally spaced radially about a 360 degree arc.

26. The pulley of claim 25 further described in that said lobes are substantially identical.

* * * * *